Jan. 16, 1968 T. F. HELMS 3,363,320
CAN BEAD DEPTH GAUGE

Filed March 23, 1966 2 Sheets-Sheet 1

INVENTOR.
THOMAS F. HELMS
BY
Robertson, Bryan, Parmelee & Johnson
ATTORNEYS.

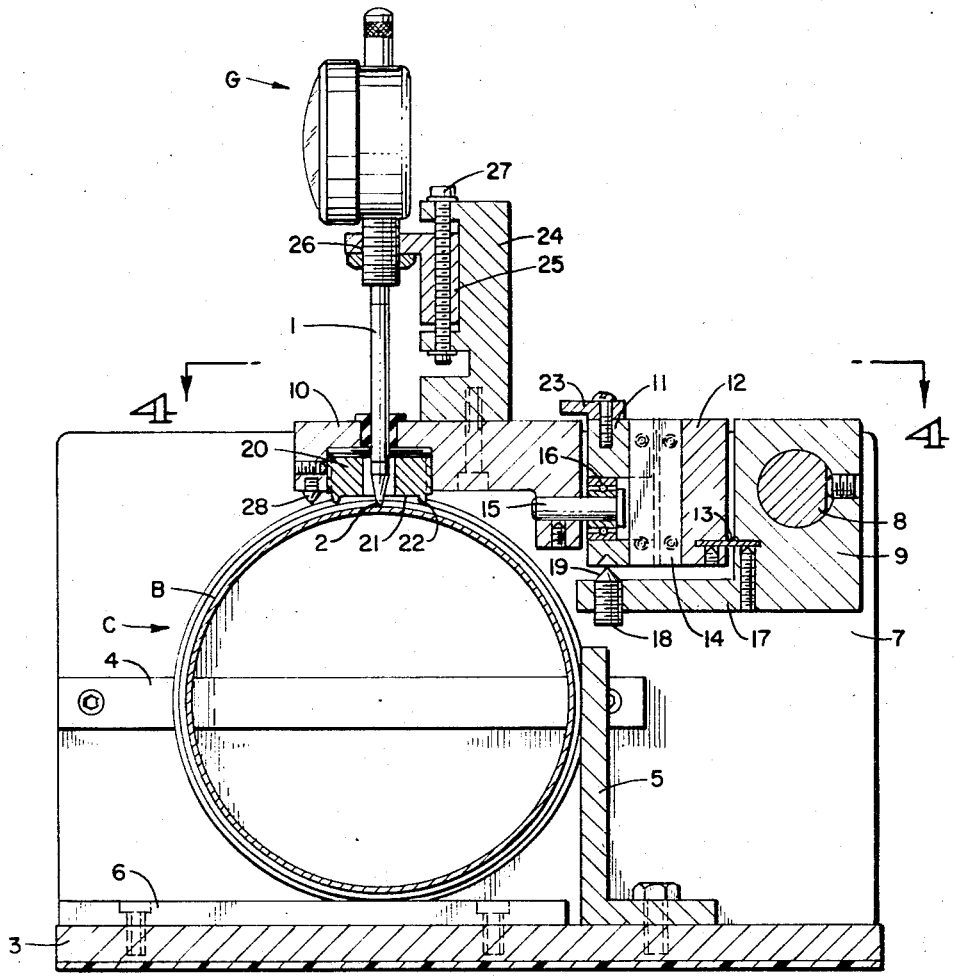
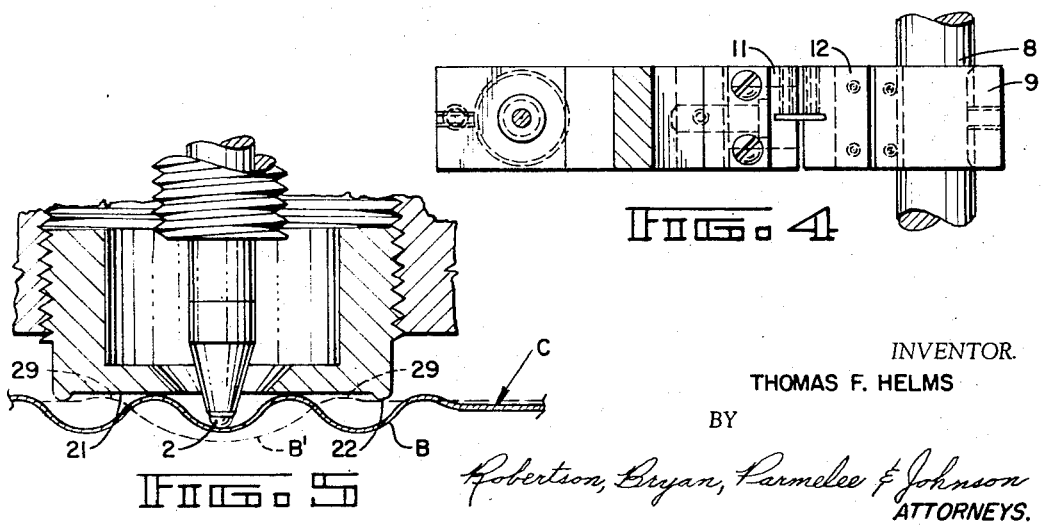

United States Patent Office 3,363,320
Patented Jan. 16, 1968

3,363,320
CAN BEAD DEPTH GAUGE
Thomas F. Helms, New Fairfield, Conn., assignor to Idex Corporation, a corporation of Connecticut
Filed Mar. 23, 1966, Ser. No. 536,723
10 Claims. (Cl. 33—172)

ABSTRACT OF THE DISCLOSURE

A measuring apparatus comprising an indexing mounting for a depth gauge having an actuator in the form of a plunger with a bearing point which is to find the bottom of a groove extending peripherally around a can body. Such indexing mounting comprises a base having stop members to index a can body in a predetermined position, and a flexible supporting structure mounted on the base to hold a gauge in position for alignment of its bearing point with the bottom of a peripheral groove of the indexed can body.

---

By virtue of the particular combination of structural features according to the invention, a gauge indexing member and the bearing point of a gauge plunger which moves with respect thereto are self-aligning in that position in which the gauge indexing member bears evenly on can surfaces at each side of the groove and the gauge plunger is in a position normal to the side of the can at the precise point of measurement with the bearing point finding the bottom of the groove.

According to a special aspect of my invention, the gauge indexing member has a centrally recessed can-engaging surface by virtue of which the centrally recessed portion can engage the crests of the "beads" of a can having a series of parallel peripheral grooves ("cluster bead"), and the edge portions at the sides of the central recess can engage the sides of the can body beyond the sides of the groove of a can having a single groove ("single bead"), bridging over any deformed areas immediately adjacent the groove.

Other features and advantages of my invention will appear from the ensuing description of the best mode contemplated by me for carrying out my invention.

FIG. 2 is a transverse sectional view taken on line 2—2 of FIG. 1.

FIG. 4 is a detail top plan view, partly in section on line 4—4 of FIG. 2.

FIG. 5 is an enlarged detail vertical longitudinal sectional view through the centerline of the gauge indexing member showing how my apparatus can be used without modification for measurement of the depths of both "cluster beads" and "single beads," and in the latter case accomplishing the measurement without having the reading affected by the distortions sometimes occurring at the edges of the bead.

Figure 1:
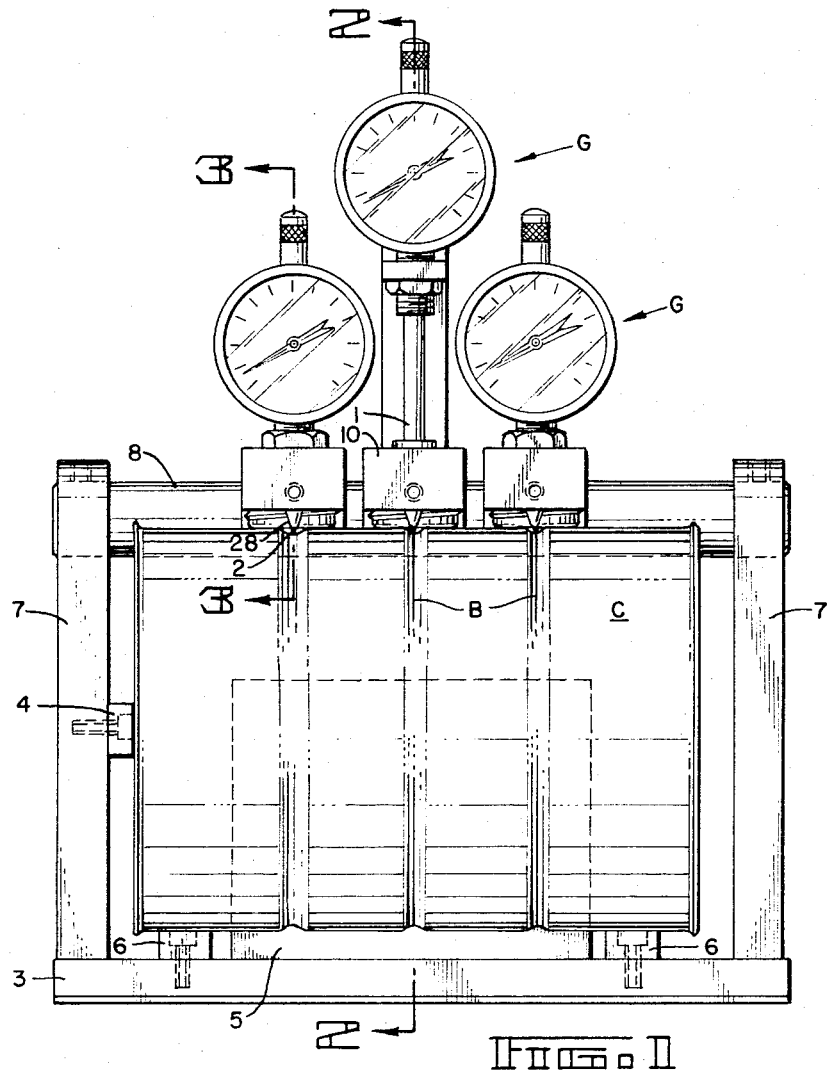
FIG. 1 is a front elevational view of my apparatus as applied to simultaneous gauging of the depths of three single grooves or beads.
Figure 3:
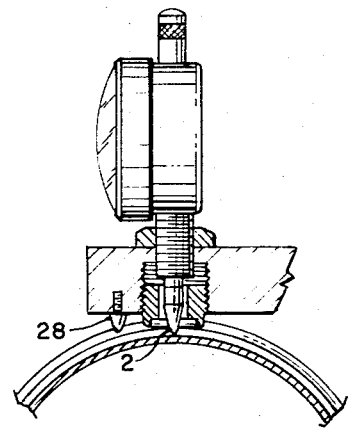
FIG. 3 is a detail transverse sectional view taken on line 3—3 of FIG. 1.

Referring to FIGS. 1 and 2, we see my apparatus in use during measurement of the depths of three single grooves or beads B extending peripherally around a can body C. The apparatus comprises an indexing mounting for a depth gauge G having an actuator in the form of a plunger 1 with a bearing point 2 which is to find the bottom of such a peripheral groove B. The indexing mounting comprises a base 3 having stop members 4, 5 and 6 to index a can body in a predetermined position, member 4 being an end stop, 5 a side stop and 6 a pair of bottom rails on which the can body is rolled or slid into place against the end and side stops. A flexible supporting structure is mounted on the base as by means of end brackets 7, support rod 8 extending between the brackets, and positioning block 9 adjustably secured on rod 8. An arm 10 in which gauge G is held is flexibly joined to positioning block 9 as by means of intermediate members 11 and 12 forming an articulated arm structure, member 12 being connected to block 9 by arm swing leaf 13 received in opposed slots of member 12 and block 9 and suitably secured as by means of set screws; members 11 and 12 are similarly connected by arm swing leaf 14 received in opposed slots of these members and suitably secured as by means of set screws. Arm swing leaves 13 and 14 may be made of spring steel or other desired material. Arm 10 is connected to member 11 by means of a shaft 15 extending into a bearing 16 in member 11.

An arm 17 extending from block 9 is threaded to receive an arm swing limit pin 18, the upwardly projecting end of which has inclined guiding surfaces 19 to center arm 10 for initial alignment of the bearing point 2 of the gauge with respect to movement in directions lengthwise of the can and to relieve the arm for such movement as it is lifted by contact with the side of the can body upon insertion of the can body. Pin 18 also serves to limit the downward swing of arm 10 prior to insertion of the can body.

Threaded into the underside of arm 10 is a gauge indexing member 20 having a centrally recessed can-engaging surface 21 provided by a peripheral bead 22.

The flexible supporting structure described holds the gauge G in position for alignment of its bearing point 2 with the bottom of a groove B of the indexed can body. The means for flexibly supporting arm 10 on the base provides an approximate alignment of the bearing point of the gauge with the bottom of the groove. The arm swing leaf 13 allows restricted freedom of movement of the arm 10 toward and away from the side of the can while arm swing leaf 14 allows restricted freedom of movement of the arm in directions generally lengthwise of the can. And by reason of the construction which includes shaft 15 and bearing 16 arm 10 can also roll one way or the other about an axis approximately parallel to the length of the arm. The freedom of movement about such axis is restricted by means of a stop 23 fixed to member 11 in a position to engage the upper surface of arm 10 after a predetermined degree of roll in either direction. The extent of movement of the arm in the several manners set forth can be adjusted as desired but by way of example I have found that a suitable adjustment is one which allows arm 10 to move upwardly 3 degrees, downwardly 3 degrees, 1 degree to either side and to roll 2 degrees in either direction around the axis of shaft 15.

The means for adjustably mounting the gauge on arm 10 includes a bracket 24 fixed to the top of the arm and carrying a movable member 25 to which the gauge is affixed as by means of the threaded engagement 26 (and suitable lock nut).

Means such as a screw 27 is provided for adjusting the position of movable member 25 toward and away from the side of the can. A projection 28 on the underside of the arm 10 is in alignment with the bearing 2 of the gauge to guide the bearing point into the center of a peripheral groove of the can body as such body is brought into position for measurement whereby lateral pressure on the gauge plunger is relieved and the bearing point more readily finds the bottom of the groove.

FIG. 5 shows how my apparatus can be used without modification for measurement of the depths of both "cluster beads" and "single beads" and in the latter case accomplishing the measurement without having the reading affected by the distortions occurring at the edges of the bead. In the showing of can C the full lines depict a cluster bead B, the dotted lines a single bead B'. Notice that when used for measurement of a cluster bead the recessed surface 21 seats on the tops of two beads, but that when used to measure a single bead edge portions 22 at the sides of the central recess engage the sides of the can body beyond the sides of groove B', bridging over any deformed areas immediately adjacent the groove. Such deformed areas are shown at 29 and in this case they project slightly beyond the main body of the can so that a true depth reading would not be obtained in the absence of the centrally recessed indexing construction described. When making the zero setting for a single bead measurement the indicator dial is zeroed on the bottom of the peripheral bead 22. When making the zero setting for measurement of a cluster bead the indicator dial is zeroed on the recessed surface 21.

A number of articulated arms 10 may be mounted on the rod 8 to accommodate the number of gauges desired. In the particular construction shown there are three such gauge mountings. In order to allow them to be brought closely together alternate gauges may be mounted at different heights in the manner shown in FIG. 1.

The terms and expressions which I have employed are used in a descriptive and not a limiting sense, and I have no intention of excluding equivalents of the invention described and claimed.

I claim:

1. Measuring apparatus for determining the depth of grooves extending peripherally around can bodies, comprising an indexing mounting for a depth gauge having an actuator in the form of a plunger with a bearing point which is to find the bottom of such a peripheral groove, said indexing mounting comprising a base having stop members to index a can body in a predetermined position thereon, and a flexible supporting structure mounted on the base to hold a gauge in position for alignment of its bearing point with the bottom of a peripheral groove of the indexed can body, said flexible supporting structure comprising
    (a) an arm in which the gauge is held in a predetermined position of adjustment,
    (b) means for flexibly supporting said arm on the base for approximate alignment of the bearing point of the gauge with the bottom of a groove of the indexed can,
    (c) a gauge indexing member mounted on said arm and having portions adapted to engage surfaces of the can at each side of the groove,
    (d) the flexible supporting means for the gauge-holding arm being constructed and arranged to allow restricted freedom of movement of the arm toward and away from the side of the can and also in directions generally lengthwise of the can, and
    (e) the flexible supporting means being further constructed and arranged to allow restricted freedom of movement of the arm about an axis approximately parallel to the length of the arm,
by virtue of all of which the gauge indexing member and the bearing point of the gauge plunger are self-aligning in that position in which the gauge indexing member bears evenly on can surfaces at each side of the groove and the gauge plunger is in a position normal to the side of the can at the precise point of measurement with the bearing point finding the bottom of the groove.

2. Measuring apparatus according to claim 1 in which said gauge indexing member (c) has a centrally recessed can-engaging surface by virtue of which the centrally recessed portion can engage the crests of the "beads" of a can having a series of parallel peripheral grooves, and the edge portions at the sides of the central recess can engage the sides of the can body beyond the sides of the groove of a can having a single groove, bridging over any deformed areas immediately adjacent the groove.

3. Measuring apparatus according to claim 1 in which said flexible supporting structure (b) includes a limit stop which before insertion of a can body to be measured holds the gauge indexing member in a positon slightly below the position it will assume upon insertion of the can body, said limit stop having inclined guiding surfaces to center said arm (a) for initial alignment of the bearing point at the gauge with respect to movement in directions lengthwise of the can and to relieve said arm (a) for such movement as it is lifted by contact between said indexing member (c) and the side of the can body upon insertion of the can body.

4. Measuring apparatus according to claim 1 in which said arm (a) includes a projection aligned with the bearing point of the gauge to guide the bearing point into the center of a peripheral groove of the can body as such body is brought into position for measurement whereby lateral pressure on the gauge plunger is relieved and the bearing point more readily finds the bottom of the groove.

5. Measuring apparatus according to claim 1 in which said arm (a) includes a bracket carrying a movable member to hold the gauge in its predetermined position of adjustment and means for adjusting the position of said movable member toward and away from the side of the can.

6. Measuring apparatus according to claim 1 in which said flexible supporting means (d) includes an articulated arm structure the several parts of which are joined together by flexible links.

7. Measuring apparatus according to claim 1 in which the flexible supporting means includes a pivoted arm section which allows the arm to roll until the gauge indexing member bears evenly on can surfaces at each side of the groove.

8. Measuring apparatus according to claim 7 in which the pivoted arm section is restricted in its rolling movement by the provision of a stop member.

9. Measuring apparatus for determining the depth of grooves extending peripherally around can bodies, comprising an indexing mounting for a depth gauge having an actuator in the form of a plunger with a bearing point which is to find the bottom of such a peripheral groove, said indexing mounting comprising a base having stop members to index a can body in a predetermined position thereon, and a flexible supporting structure mounted on the base to hold a gauge in position for alignment of its bearing point with the bottom of a peripheral groove of the indexed can body, said flexible supporting structure comprising
    (a) an arm in which the gauge is held in a predetermined position of adjustment,
    (b) means for flexibly supporting said arm on the base for approximate alignment of the bearing point of the gauge with the bottom of a groove of the indexed can,
    (c) a gauge indexing member mounted on said arm and having portions adapted to engage surfaces of the can at each side of the groove, and
    (d) the gauge indexing member having a centrally recessed can-engaging surface by virtue of which the centrally recessed portion can engage the crests of the "beads" of a can having a series of parallel peripheral grooves, and the edge portions at the sides of the central recess can engage the sides of the can body beyond the sides of the grooves of a can having a single groove, bridging over any deformed areas immediately adjacent the groove.

10. Measuring apparatus according to claim 9 in which the centrally recessed surface is provided by an adjustable cup having a peripheral bead.

No references cited.

SAMUEL S. MATTHEWS, *Primary Examiner.*